US011260516B1

(12) United States Patent
Roberts (10) Patent No.: US 11,260,516 B1
(45) Date of Patent: Mar. 1, 2022

(54) BARRING DEVICE ATTACHMENT FOR PROVIDING ENGINE MAINTENANCE

(71) Applicant: Ryan Roberts, Aztec, NM (US)

(72) Inventor: Ryan Roberts, Aztec, NM (US)

( * ) Notice: Subject to any disclaimer, the term of this patent is extended or adjusted under 35 U.S.C. 154(b) by 215 days.

(21) Appl. No.: 16/792,968

(22) Filed: Feb. 18, 2020

(51) Int. Cl.
| | | |
|---|---|---|
| *B25B 21/00* | (2006.01) | |
| *B25B 17/00* | (2006.01) | |
| *B25F 5/00* | (2006.01) | |
| *B25B 23/14* | (2006.01) | |
| *B25D 16/00* | (2006.01) | |
| *B23B 45/00* | (2006.01) | |

(52) U.S. Cl.
CPC ............... *B25F 5/001* (2013.01); *B25B 21/00* (2013.01); *B23B 45/008* (2013.01); *B25B 17/00* (2013.01); *B25B 23/141* (2013.01); *B25D 16/006* (2013.01); *B25D 2216/0023* (2013.01); *B25D 2216/0038* (2013.01)

(58) Field of Classification Search
CPC ......... B25F 5/001; B25B 21/00; B25B 17/00; B23B 45/008; F01D 25/36
USPC .......................................................... 173/48
See application file for complete search history.

(56) References Cited

U.S. PATENT DOCUMENTS

| | | | |
|---|---|---|---|
| 2,724,289 A | 11/1955 | Wight | |
| 3,321,985 A | 5/1967 | Wheeler | |
| 3,395,588 A | 8/1968 | Bleigh et al. | |
| 3,712,751 A * | 1/1973 | Dietrich | B27C 9/02 408/20 |
| 3,822,595 A * | 7/1974 | Elflein | B21J 15/26 29/243.526 |
| 4,072,063 A | 2/1978 | Nauman | |
| 4,185,514 A * | 1/1980 | Edwards | F16H 1/16 74/421 A |
| 4,261,232 A * | 4/1981 | Yamazaki | B25B 21/005 29/240 |
| 4,495,699 A * | 1/1985 | Oakes | B21D 28/343 30/360 |
| 4,580,534 A | 4/1986 | Blum et al. | |
| 5,345,845 A * | 9/1994 | Myers | B25B 17/00 403/291 |
| 5,460,138 A | 10/1995 | Hasegawa | |
| 5,630,343 A * | 5/1997 | Begin | B25B 13/481 81/57.13 |
| 5,882,181 A | 3/1999 | Genter et al. | |
| 5,997,260 A | 12/1999 | Genter et al. | |
| 6,009,776 A * | 1/2000 | Warren | B25B 13/467 81/57.13 |
| 6,305,236 B1 * | 10/2001 | Sturdevant | B25B 17/00 74/421 A |
| 6,651,532 B1 * | 11/2003 | Whitelock | B25B 13/481 81/57.26 |

(Continued)

FOREIGN PATENT DOCUMENTS

| | | | | |
|---|---|---|---|---|
| GB | 2046155 | * | 11/1980 | ........... B25B 21/002 |
| GB | 2508091 | * | 5/2014 | ........... B25B 21/004 |

(Continued)

*Primary Examiner* — Gloria R Weeks (74) *Attorney, Agent, or Firm* — Cramer Patent & Design, PLLC; Aaron R. Cramer (57) ABSTRACT

A barring device attachment includes a right-angle worm drive gear box configured to accommodate mechanical input from an electric drill. The attachment is particularly suited to mount to an engine to arrest rotational motion thereof in order to provide maintenance thereon.

20 Claims, 6 Drawing Sheets

(56) References Cited

U.S. PATENT DOCUMENTS

| | | | | |
|---|---|---|---|---|
| 7,191,677 | B2* | 3/2007 | Barkdoll | B23Q 5/045 |
| | | | | 173/216 |
| 7,797,840 | B2* | 9/2010 | Bublitz | B21D 28/243 |
| | | | | 30/358 |
| 8,549,946 | B2 | 10/2013 | Pang | |
| 9,079,296 | B1* | 7/2015 | Martucci | B25B 23/0028 |
| 9,726,132 | B2 | 8/2017 | Pawlicki | |
| 9,810,100 | B2 | 11/2017 | Bastier et al. | |
| 10,427,276 | B2* | 10/2019 | Barzelay | F16H 57/0486 |
| 2007/0125203 | A1* | 6/2007 | Nguyen | B25B 13/481 |
| | | | | 81/57.29 |
| 2008/0011135 | A1* | 1/2008 | Ray | B21D 28/343 |
| | | | | 83/55 |
| 2008/0210076 | A1* | 9/2008 | Bublitz | B21D 28/243 |
| | | | | 83/613 |
| 2013/0305544 | A1* | 11/2013 | Haase | B26D 5/08 |
| | | | | 30/360 |
| 2015/0343583 | A1* | 12/2015 | McRoberts | B25F 5/02 |
| | | | | 173/213 |

FOREIGN PATENT DOCUMENTS

| | | | | |
|---|---|---|---|---|
| JP | 2012135861 | * | 7/2012 | B25B 21/00 |
| WO | WO-8600556 | * | 1/1986 | B25B 17/00 |
| WO | WO-2012020266 A1 | * | 2/2012 | B66D 1/7468 |

* cited by examiner

200~# BARRING DEVICE ATTACHMENT FOR PROVIDING ENGINE MAINTENANCE

FIELD OF THE INVENTION

The presently disclosed subject matter is directed to a barring device and more specifically to a barring device attachment for providing engine maintenance.

BACKGROUND OF THE INVENTION

As anyone who performs a lot of mechanical work will attest, nothing beats having the proper tool for a job. The proper tool can save time, save money, produce a higher quality job, reduce damage to equipment, and provide for the increased safety of the worker. Each field of mechanical work has its own type of specialty tools, each performing a specialized task.

One field where there has been a need for such a specialized tool is during the maintenance or repair of large industrial engines. It is often necessary to rotate internal engine components to an exact position for work such as coupling alignment, valve adjustments, timing adjustments/alignments, gear alignment, piston removal, and other maintenance or repair processes. Current barring devices and procedures rely on the use of large pry bars, extension ratchets and other brute force methods. Not only do such methods require large amounts of physical strength, but end up being inaccurate, difficult to hold in place, and a safety concern.

Accordingly, there exists a need for a means by which internal engine components can be easily positioned in an effort to address the above shortcomings. The development of the barring device attachment for providing engine maintenance fulfills this need.

SUMMARY OF THE INVENTION

The principles of the present invention provide for a barring device attachment comprises a right-angle worm drive reducing gearbox which has an input shaft and an output shaft. The output shaft is connected to a drive socket by use of a shear bolt and the input shaft is provided with an adapter which allows the barring device attachment to be driven by a plurality of drive tools. The barring device attachment also comprises a base plate which is mounted to the right-angle worm drive reducing gearbox, a mounting plate which is attached to a distal end of the base plate and a barring device which has a flange adapter completed with a drive bolt, an engagement spring, and a drive gear.

The adapter may be a hex drive adapter. The drive tools may be a tool selected from the group consisting of a drill, a power ratchet, or a hand ratchet. The drive tools may be with an impact tool. The impact tool may be air-operated impact gun or an electric impact driver. The drive socket may engage the drive bolt through a circular hole in the mounting plate when in a mounted state. The circular hole in the mounting plate may allow the drive socket to engage the drive bolt. The shear bolt connects the drive socket to the output shaft. The output shaft and the hex drive adapter may exist the right-angle worm drive reducing gearbox at a ninety-degree angle.

The shear bolt may protect the barring device attachment against damage due to over torque conditions resulting from improper operation of the barring device attachment, the drive tools, or a driven engine. The drive tool may produce a rotational input movement on the input shaft and a corresponding rotational output movement is produced on the output shaft. The input shaft may be axially aligned and physically coupled to a worm gear and supported by a pair of input shaft bearings. The worm gear may drive a main output gear that is directly aligned and coupled to the output shaft. The drive bolt may allow for external force to slowly move the driven first engine or the driven second engine for maintenance or repair. The right-angle worm drive reducing gearbox may be filled with a lubricant to reduce friction and wear of the worm gear, the main output gear, the input shaft bearings and the output shaft bearings during operation.

The base plate may be mounted to the right-angle worm drive reducing gearbox with a plurality of bolts. The mounting plate may be attached to the distal end of the base plate with a plurality of welds. The mounting plate may be connected to the right-angle worm drive reducing gearbox via the base plate. The barring device attachment may also comprise a slotted mounting hole in the mounting plate which mounts the barring device attachment during use.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 barring device attachment
15 right-angle worm drive reducing gearbox
20 base plate
25 attachment means
30 mounting plate
31 weld
35 input shaft
40 output shaft
45 hex drive adapter
50 drive tool
55 drive socket
60 shear bolt
65 first engine
66 second engine 70 barring device
75 flange adapter
80 drive bolt
85 engagement spring
90 drive gear
95 circular hole
100 power cord
105 connecting chuck
110 rotational input movement "i"
115 rotational output movement "o"
120 slotted mounting hole
125 worm gear
130 input shaft bearing
135 main output gear
140 output shaft bearing
150 fastening bolt
155 housing

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Figure 1:
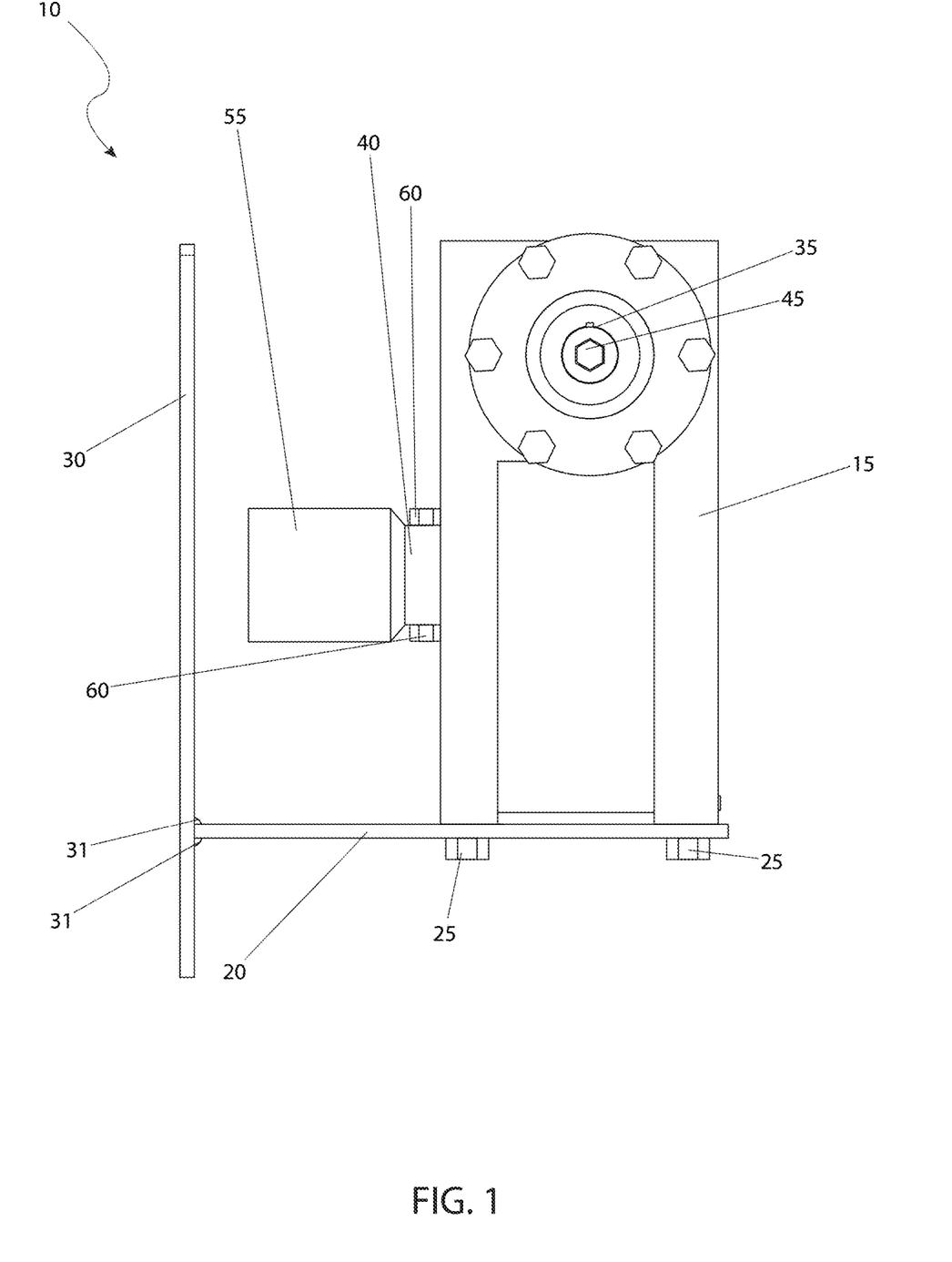
FIG. 1 is a front view of the barring device attachment 10, according to the preferred embodiment of the present invention.

Referring now to FIG. 1, a front view of the barring device attachment 10, according to the preferred embodiment of the present invention is disclosed. The barring device attachment 10 (herein also described as the "device") 10, includes a right-angle worm drive reducing gearbox 15 mounted to a base plate 20 by multiple attachment means 25 such as bolts. The distal end of the base plate 20 is provided with a mounting plate 30, attached via welds 31, whose further description and functionality will be described herein below. The right-angle worm drive reducing gearbox 15 is provided with an input shaft 35 and a n output shaft 40 in the typical expected manner. The input shaft 35 is provided with a hex drive adapter 45 to allow the device 10 to be driven by a wide variety of drive tools 50 (not shown in this figure due to illustrative limitations) including, but not limited to: a drill, a power ratchet, or a hand ratchet. The use of any type of impact tool such as air-operated impact guns, electric impact drivers and the like should not be used due to potential damage to the device 10. The output shaft 40 is connected to a drive socket 55 by use of a shear bolt 60. The shear bolt 60 protects the device 10 against damage due to over torque conditions resulting from improper operation of the device 10, the drive tools 50, and/or the driven engine 65 (not shown in this figure due to illustrative limitations).

Figure 2:
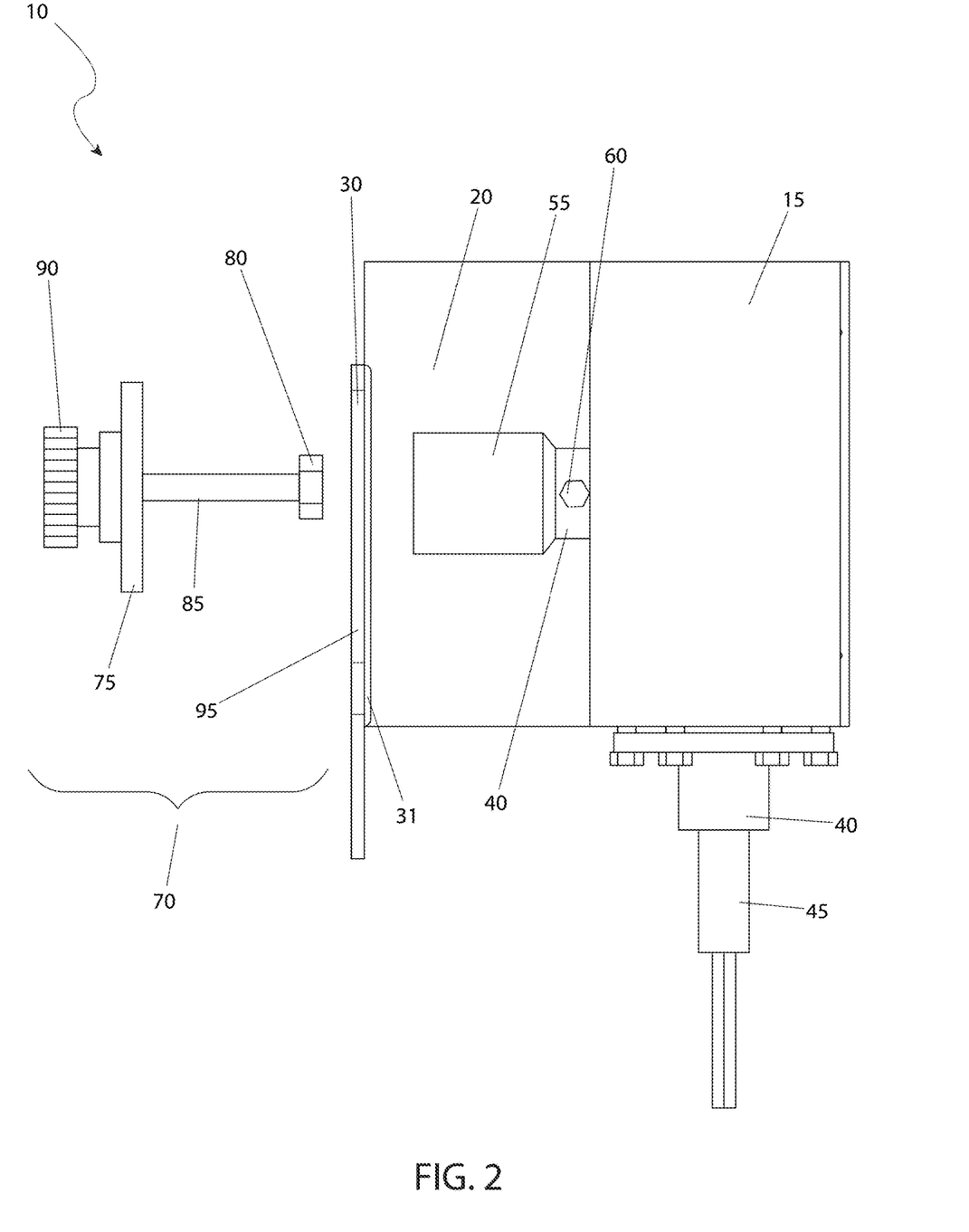
FIG. 2 is a top view of the barring device attachment 10, shown with a barring device 70 ready to be engaged, according to the preferred embodiment of the present invention.

Referring next to FIG. 2, a top view of the device 10, shown with a barring device 70 ready to be engaged, according to the preferred embodiment of the present invention is depicted. The barring device 70 currently exists in the art and whose functionality, design, and operation is not within the claims of the present invention. The barring device 70 includes a flange adapter 75 completed with a drive bolt 80, an engagement spring 85, and a drive gear 90. The drive bolt 80 allows for the application of external force to slowly move internal components of the driven first or second engine 65, 66 (not shown in this figure) for the purposes of maintenance or repair. The drive socket 55 engages the drive bolt 80 through a circular hole 95 in the mounting plate 30 when in a mounted state. The mounting plate 30 is connected to the right-angle worm drive reducing gearbox 15 via the base plate 20 as aforementioned described. The shear bolt 60 connects the drive socket 55 to the output shaft 40. The output shaft 40 and the hex drive adapter 45 are visible exiting the right-angle worm drive reducing gearbox 15 at a ninety degree (90°) angle.

Figure 3:
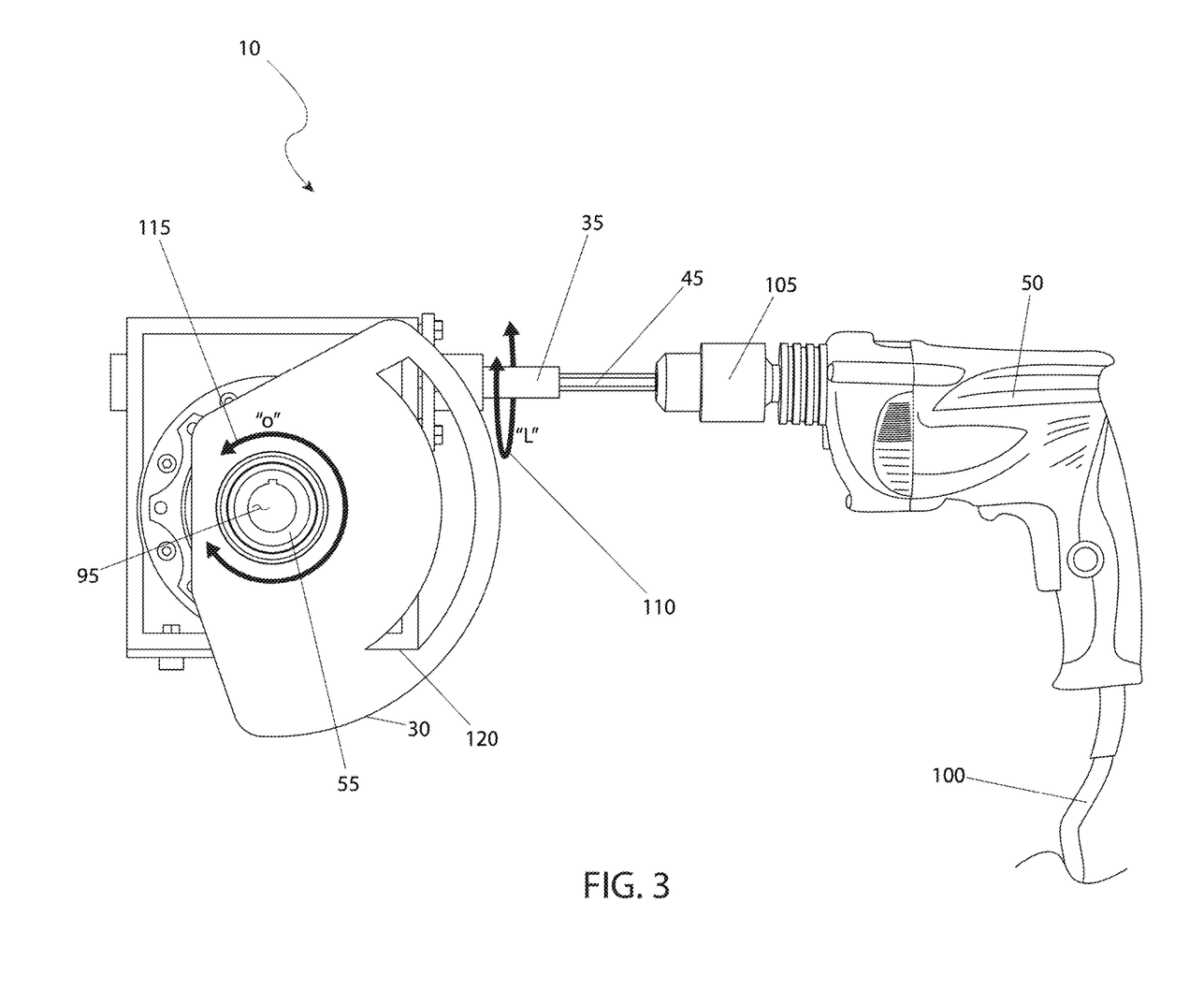
FIG. 3 is a perspective view of the barring device attachment 10, equipped with a drive tool(s) 50, according to the preferred embodiment of the present invention.

Referring now to FIG. 3, a perspective view of the device 10, equipped with a drive tool(s) 50, according to the preferred embodiment of the present invention is shown. The drive tool 50 is depicted as an electrically operated drill for purposes of illustration. As aforementioned described, other drive tools 50 such as powered ratchets and hand ratchets may also be utilized with the device 10. As such, the use of any specific type of drive tool 50 is not intended to be a limiting factor of the present invention. It is preferred that the drive tool 50 be provided with reversing capability to allow for driving in both rotational directions. The connecting chuck 105 is connected to the hex drive adapter 45 in a customary and expected manner. Thus, as the drive tool 50 produces a rotational input movement "i" 110 on the input shaft 35, a corresponding rotational output movement "o" 115 is produced on the output shaft 40. The circular hole 95 in the mounting plate 30 is visible to allow the drive socket 55 to engage the drive bolt 80 as shown in FIG. 2. A slotted mounting hole 120 in the mounting plate 30 allows for mounting of the device 10 during use.

Figure 4:
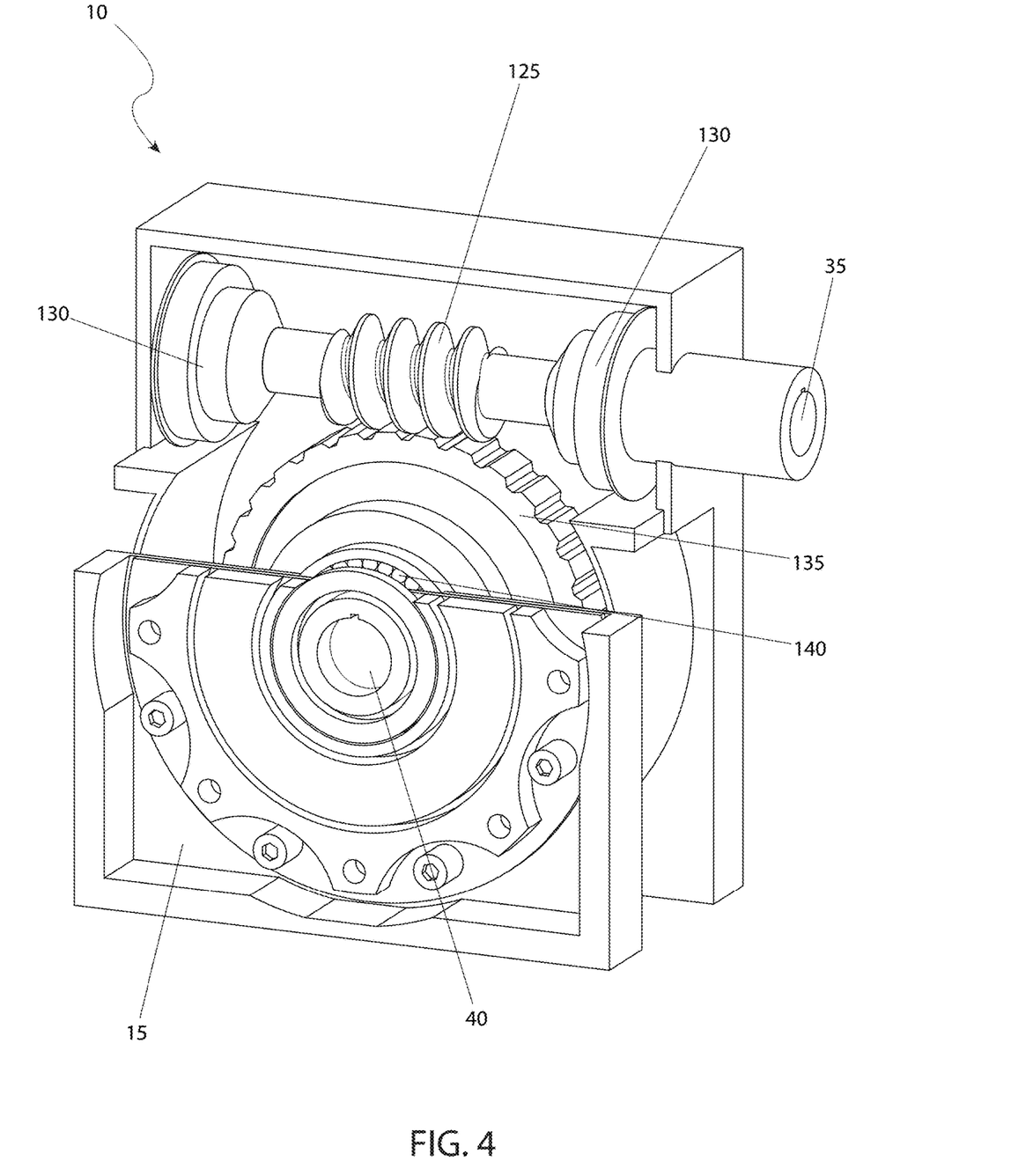
FIG. 4 is a perspective view of the barring device attachment 10, shown in a cutaway state, showing the major internal components of the right-angle worm drive reducing gearbox 15, according to the preferred embodiment of the present invention.

Referring next to FIG. 4, a perspective view of the device 10, shown in a cutaway state, showing the major internal components of the right-angle worm drive reducing gearbox 15, according to the preferred embodiment of the present invention is disclosed. The input shaft 35 is axially aligned and physically coupled to a worm gear 125 and supported by two (2) input shaft bearings 130. The worm gear 125 drives a main output gear 135 that is in turn directly aligned and coupled to the output shaft 40. The output shaft 40 is supported by two (2) output shaft bearings 140, of which only one (1) is depicted due to illustrative limitations. It is envisioned that the right-angle worm drive reducing gearbox 15 would be filled with lubricant to aid in reducing friction and wear of the worm gear 125, the main output gear 135, as well as the input shaft bearings 130 and the output shaft bearings 140 during operation.

Figure 5:
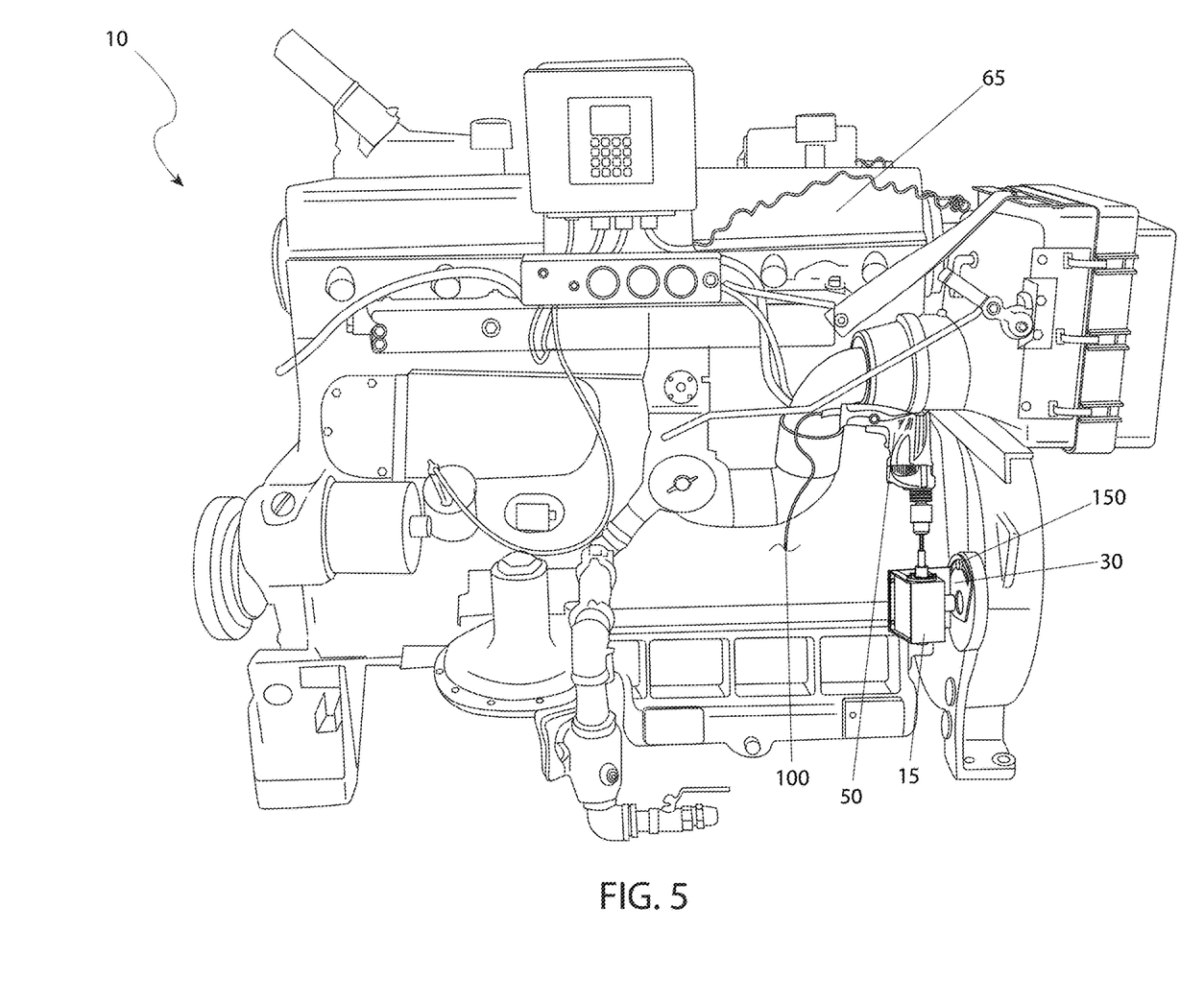
FIG. 5 is a perspective view of the barring device attachment engine 10, shown in a utilized state upon a driven first engine 65, according to an exemplary use of the present invention; and, FIG. 6 is a perspective view of the barring device attachment engine 10, shown in a utilized state upon a driven second engine 66, according to another exemplary use of the present invention.
Figure 6:
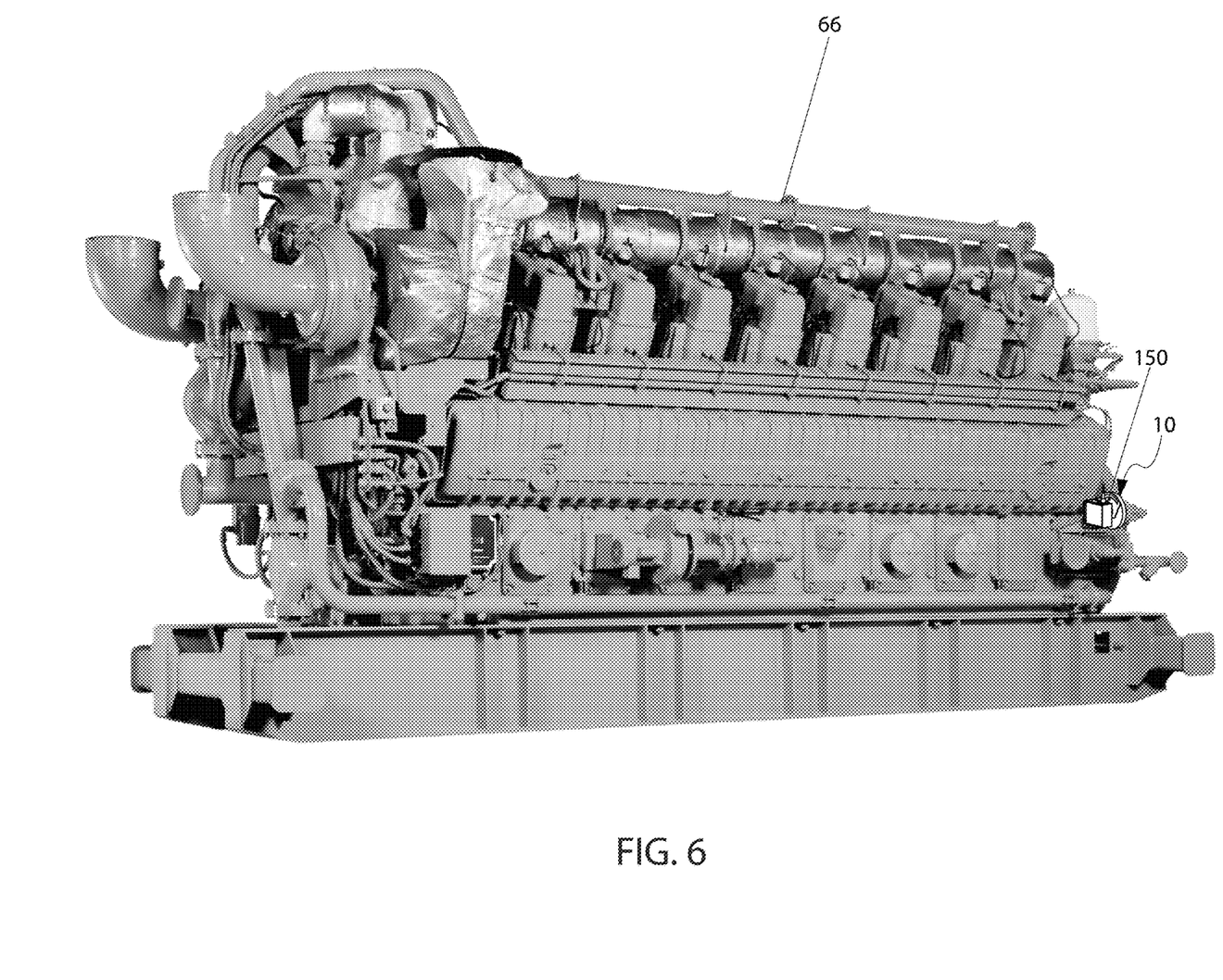

Referring to FIG. 5, a perspective view of the device 10, shown in a utilized state upon a driven first engine 65, and FIG. 6, a perspective view of the device 10, shown in a utilized state upon a driven second engine 66 according to the preferred embodiment of the present invention is depicted. The driven first or second engine 65, 66 is depicted as a large industrial engine powered by natural gas, however, the device 10 may be used with any type of engine or machine requiring the positioning functionality as provided by the device 10. As such the use of the device 10 with any particular type of driven first or second engine 65, 66 is not intended to be a limiting factor of the present invention.

The mounting plate 30 is aligned with the barring device 70 (not shown in this figure due to illustrative limitations) and held in place with a fastening bolt 150 which engages the mounting plate 30 as well as the flange adapter 75 (as shown in FIG. 2) to the housing 155 of the driven first or second engine 65, 66. The drive tool 50 with its power cord 100, if needed, is positioned upon the right-angle worm drive reducing gearbox 15 to complete the installation process. Such a feature allows the drive tool 50 to drive the internal components of the driven first or second engine 65, 66 as necessary with precision without the normal difficulties associated with conventional barring means such as prybars, extension bars, and other force multipliers which create dangerous situations due to the forces generated should they slip or fail.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 4. The user would procure the device 10 from conventional procurement channels such as original equipment manufacturer (OEM) suppliers, mechanical supply houses, mail order and internet supply houses and the like. Special attention would be paid to the size needed depending on the size of the driven first engine 65 (as seen in FIG. 5) or second engine 66 (as seen in FIG. 6).

After procurement and prior to utilization, the device maintenance 10 would be prepared in the following manner: the user would first ensure that the driven first or second engine 65, 66 is shut down and locked out to prevent inadvertent rotation; the drive bolt 80 and the drive gear 90 of the barring device 70 would be cleaned and lubricated. A fastening bolt 150 would be removed from either the "three o'clock" or "nine o'clock" position on the housing 155, depending on which side the device 10; mount the device 10 using the slotted mounting hole 120 so that the drive socket 55 engages the barring device 70 and compresses the engagement spring 85 down with positive flywheel engagement; tighten the fastening bolt 150 to sixty foot-pounds (60 ft.-lbs.); attach the drive tool 50 to the hex drive adapter 45 using conventional manners; and slowly operate the drive tool 50 to position the internal components of the driven first or second engine 65, 66 to the desired position.

During utilization of the device 10, the following procedure would be initiated: operate the drive tool 50 in a continuous manner to cycle (rotate) all components as needed, sporadic operation in a pulsing manner can accurately position said internal components of the driven first or second engine 65, 66 to a desired position for purposes including but not limited to coupling alignment, valve adjustments, timing adjustments/alignments, gear alignment, piston removal, and other maintenance or repair processes.

After use of the device 10, the device 10 may be left in place or removed as determined by the user. This operation will continue in a cyclical manner as needed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A barring device attachment, comprising:
    a right-angle worm drive reducing gearbox having an input shaft and an output shaft, the output shaft is connected to a drive socket by use of a shear bolt and the input shaft is provided with an adapter to allow the barring device attachment to be driven by a plurality of drive tools;
    a base plate mounted to the right-angle worm drive reducing gearbox;
    a mounting plate attached to a distal end of the base plate; and
    a barring device having a flange adapter completed with a drive bolt, an engagement spring, and a drive gear.

2. The barring device attachment according to claim 1, wherein the adapter is a hex drive adapter.

3. The barring device attachment according to claim 1, wherein the drive tools are a tool selected from the group consisting of a drill, a power ratchet, or a hand ratchet.

4. The barring device attachment according to claim 1, wherein the drive tools are with an impact tool.

5. The barring device attachment according to claim 4, wherein the impact tool is an air-operated impact gun.

6. The barring device attachment according to claim 4, wherein the impact tool is an electric impact driver.

7. The barring device attachment according to claim 1, wherein the drive socket engages the drive bolt through a circular hole in the mounting plate when in a mounted state.

8. The barring device attachment according to claim 7, wherein the circular hole in the mounting plate allows the drive socket to engage the drive bolt.

9. The barring device attachment according to claim 1, wherein the shear bolt connects the drive socket to the output shaft.

10. The barring device attachment according to claim 1, wherein the output shaft and the hex drive adapter exits the right-angle worm drive reducing gearbox at a ninety-degree angle.

11. The barring device attachment according to claim 10, wherein the shear bolt protects the barring device attachment against damage due to over torque conditions resulting from improper operation of the barring device attachment, the drive tools, or a driven engine.

12. The barring device attachment according to claim 1, wherein the drive tool produces a rotational input movement on the input shaft and a corresponding rotational output movement is produced on the output shaft.

13. The barring device attachment according to claim 1, wherein the input shaft is axially aligned and physically coupled to a worm gear and supported by a pair of input shaft bearings.

14. The barring device attachment according to claim 13, wherein the worm gear drives a main output gear that is directly aligned and coupled to the output shaft.

15. The barring device attachment according to claim 1, wherein the drive bolt allows for external force to slowly move the driven first engine or the driven second engine for maintenance or repair.

16. The barring device attachment according to claim 1, wherein the right-angle worm drive reducing gearbox is filled with a lubricant to reduce friction and wear of the worm gear, the main output gear, the input shaft bearings and the output shaft bearings during operation.

17. The barring device attachment according to claim 1, wherein the base plate mounted to the right-angle worm drive reducing gearbox with a plurality of bolts.

18. The barring device attachment according to claim 1, wherein the mounting plate is attached to the distal end of the base plate with a plurality of welds.

19. The barring device attachment according to claim 1, wherein the mounting plate is connected to the right-angle worm drive reducing gearbox via the base plate.

20. The barring device attachment according to claim 1, further comprising a slotted mounting hole in the mounting plate mounts the barring device attachment during use.

\* \* \* \* \*